United States Patent
Pazdernik et al.

[19]

[11] Patent Number: 6,094,888
[45] Date of Patent: Aug. 1, 2000

[54] SYSTEM AND METHODS FOR MECHANICALLY PROCESSING BAGS

[75] Inventors: Irvan Pazdernik; Jerry Dahlheimer, both of Alexandria, Minn.

[73] Assignee: Douglas Machine Limited Liability Company, Alexandria, Minn.

[21] Appl. No.: 09/148,340

[22] Filed: Sep. 4, 1998

[51] Int. Cl.$^7$ .................................................... B65B 1/24
[52] U.S. Cl. ............................. 53/436; 53/437; 53/525; 53/526; 53/527
[58] Field of Search ................................ 53/76, 235, 436, 53/251, 437, 523, 526, 525, 527, 528; 198/406, 407, 408

[56] References Cited

U.S. PATENT DOCUMENTS

| | | | |
|---|---|---|---|
| 4,027,458 | 6/1977 | Goodman | 53/251 |
| 4,611,458 | 9/1986 | Prakken | 53/251 |
| 4,648,233 | 3/1987 | Holland | 53/251 |
| 4,800,703 | 1/1989 | Goodman | 53/251 |
| 4,867,298 | 9/1989 | Milliner et al. | 198/408 |
| 5,251,422 | 10/1993 | Goodman et al. | 53/251 |
| 5,622,025 | 4/1997 | Kitagawa et al. | 53/251 |
| 5,881,532 | 3/1999 | Kitagawa | 53/251 |

*Primary Examiner*—Eugene Kim
*Attorney, Agent, or Firm*—Alan Kamrath; Oppenheimer Wolff & Donnelly LLP

[57] ABSTRACT

A system (10) for processing pliable, sealed bags (16) includes an inlet section (176) for transferring the bags (16) onto a lower conveyor (152) with the lower end being downstream of the bag upper end and allowing product not contained by the bags (16) to fall through the inlet section (176). The bags (16) on the lower conveyor (152) pass beneath an overhead conveyor (194), with product being dispersed inside of the bag (16) as the result of the rotation of a conditioning roller (168) engaging and flexing the belting (158) of the lower conveyor (152). The endless carrier of the overhead conveyor (194) is deflected by first and second support plates (216, 220) slideably received in flexible guides (212). The first support plates (216) places pressure on the bags (16) to force air out of improperly sealed bags (16) while the movement of the second support plates (220) is detected to determine whether the bags (16) are within a tolerable thickness.

15 Claims, 2 Drawing Sheets

SYSTEM AND METHODS FOR MECHANICALLY PROCESSING BAGS

BACKGROUND

The present invention generally relates to systems and methods for mechanically processing bags, and more particularly relates to systems and methods for mechanically processing pliable bags containing relatively fragile products including but not limited to potato chips or the like.

As labor costs increase, there is an increasing need for the mechanical processing of products. One area where special problems have arisen is the mechanical processing of pliable bags including products which are of a deformable shape and especially which are relatively fragile including but not limited to potato chips and the like. Specifically, in developing a pliable bag processing system, various parameters must be considered. For instance, the product contained in the bag can significantly impact the manner in which the bags can be handled. For example, if the bags contain relatively fragile food products such as potato chips or the like which can be easily crushed, the processing system must safeguard against damaging the product contained in the bag.

In preferred forms, such processing systems include provisions for testing bags for acceptability and for packaging the acceptable bags into cartons or other types of containers. It can be appreciated that it is desirable that such systems mechanically process bags at the same rate the apparatus form, fill, and seal the bags and which are very reliable so as not to disrupt the production line. Although various automated bag processing systems have been proposed over the years and have exhibited at least to a certain extent advantages in efficiencies and overall associated costs, such prior systems have significant drawbacks depending on the particular system design and layout.

SUMMARY

The present invention addresses these and other concerns in the structure and operation of a mechanical processing system for pliable bags or the like by providing, in preferred forms, an inlet section including a plurality of bands located in and extending between axially spaced circumferential grooves of first and second pulleys and including a slide extending at an obtuse angle to each of the bands with bags in a vertical orientation having lower ends contacting and sliding on the slide toward and onto the bands for being conveyed by the bands with the lower end being downstream of the bag upper end.

In other preferred aspects, the present invention provides a conditioning roller rotatable about an axis and having a periphery of an unequal spacing from the axis for engaging with and deflecting an endless belting conveying a sealed bag for dispersing product that has been bunched adjacent to a first end of the sealed bag. In the most preferred form, the sealed bag is conveyed with the first end being at a higher elevation than the second end.

In still other preferred aspects, the endless carrier of an overhead conveyor is deflected toward the endless carrier of a lower conveyor by first and second support plates which are parallel to the lower conveyor and the movement of the sealed bag, with the deflection of the second support plate located downstream of the first support plate being detected by a sensor to test the bags for proper sealing.

In further preferred aspects, an endless carrier is slideably captured on a flexible chain guide having generally C-shaped cross sections adapted to slideably receive a support plate having a shape, with the chain guide being rendered flexible by a series of longitudinally spaced lateral cuts so that the endless carrier has the shape of the support plate while passing over the support plate and being flexible at other positions spaced from the support plate.

It is thus an object of the present invention to provide novel system and methods for mechanically processing bags.

It is further an object of the present invention to provide such novel bag mechanically processing system and methods including an inlet section which insures that vertically oriented bags are transferred to a conveyor with the lower end being downstream of the upper end while allowing product not contained in the sealed bag to fall through the inlet section and not being carried thereby.

It is further an object of the present invention to provide such novel bag mechanically processing system and methods which disperse product within a sealed bag by rotating a conditioning roller at a constant rotational speed which engages the endless carrier of the sealed bag and without changing the speed of the sealed bag in the conveying direction.

It is further an object of the present invention to provide such novel bag mechanically processing system and methods which tests the sealed bag by deflecting the endless carrier of an overhead conveyor by first and second support plates which are parallel to the lower conveyor and the bag movement direction, with the movement of the second support plate downstream of the first support plate being detected by a sensor to insure that a desired volume of air is trapped with the product in the sealed bag.

It is further an object of the present invention to provide such novel bag mechanically processing system and methods wherein an endless carrier is slideably captured on a flexible chain guide and has the shape of a support plate slideably received in the flexible chain guide and being flexible at other positions spaced from the support plate.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
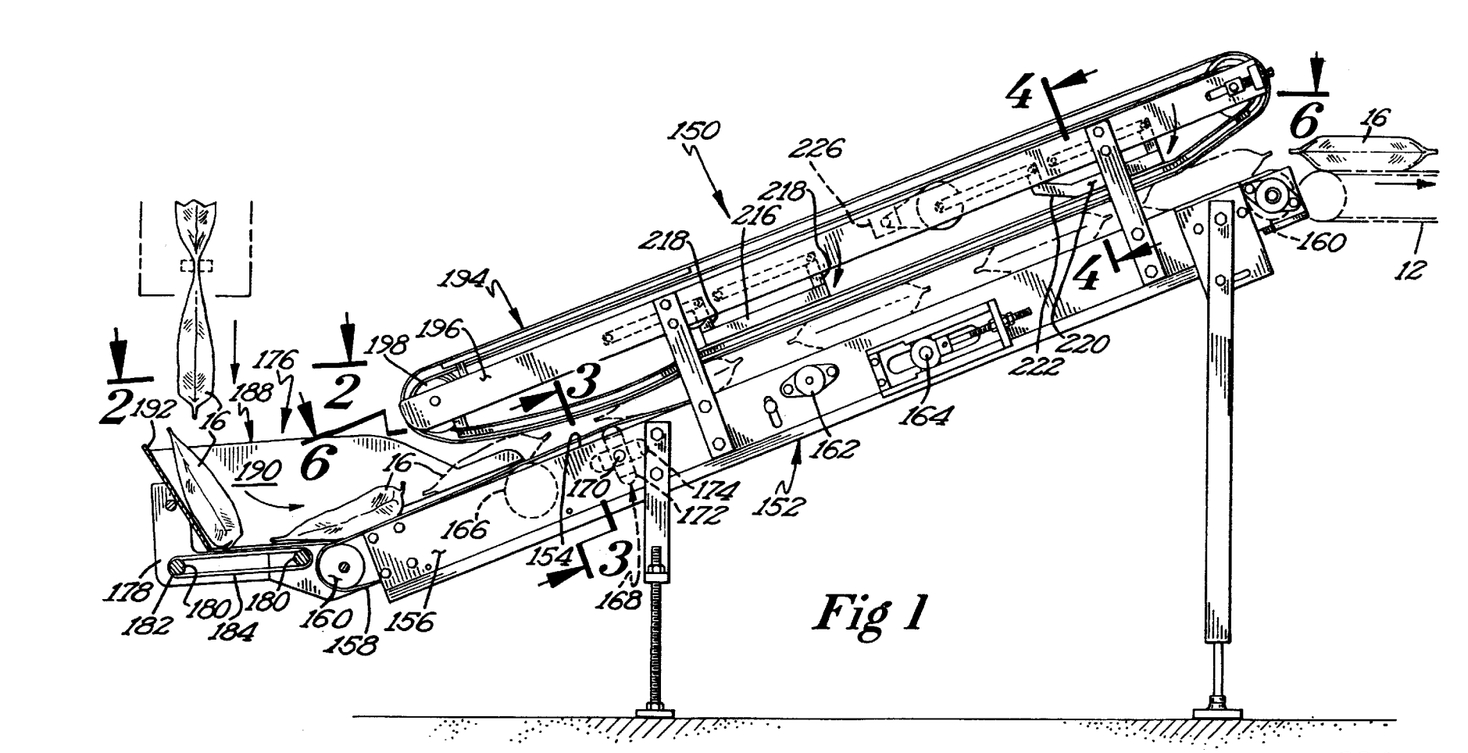
FIG. 1 shows a front view of a system for mechanically processing sealed pliable bags according to the preferred teachings of the present invention, with portions broken away and with portions shown in phantom to show constructional details.
Figure 2:
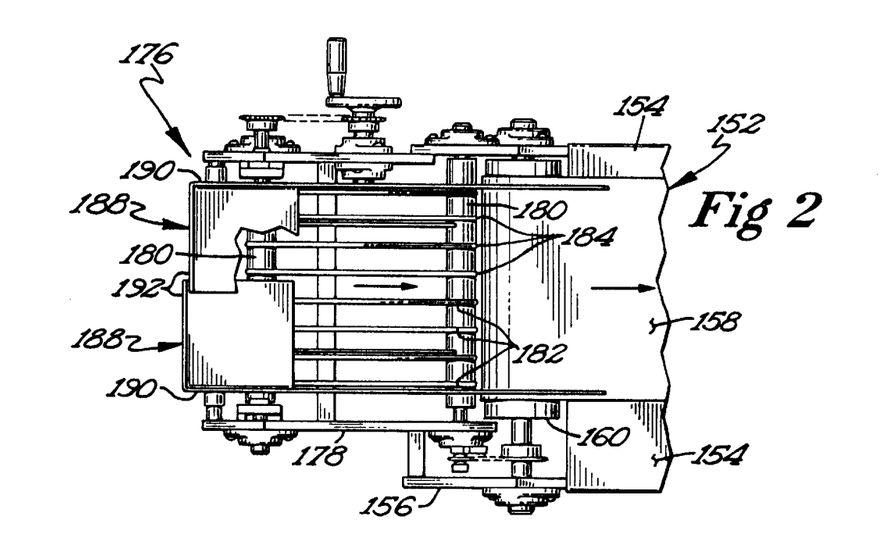
FIG. 2 shows a partial, top view of the bag mechanically processing system of FIG. 1 according to view line 2—2 of FIG. 1.
Figure 3:
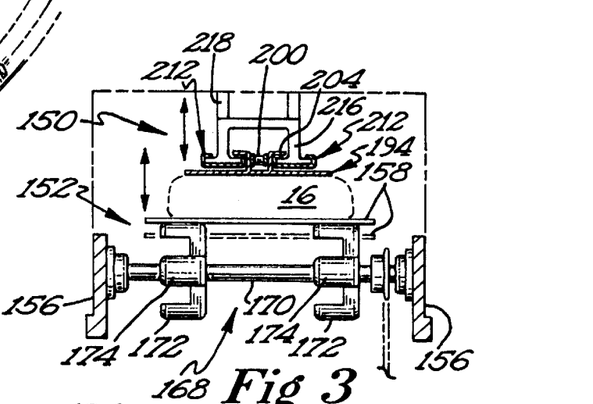
FIG. 3 shows a cross sectional view of the bag mechanically processing system of FIG. 1 according to section line 3—3 of FIG. 1.
Figure 4:
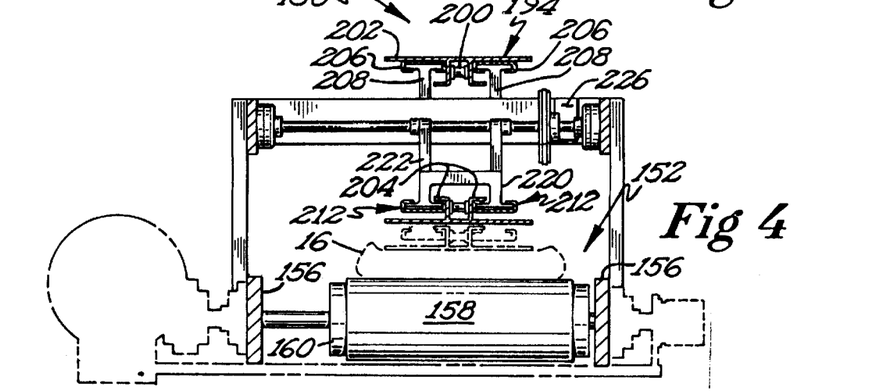
FIG. 4 shows a cross sectional view of the bag mechanically processing system of FIG. 1 according to section line 4—4 of FIG. 1.
Figure 5:
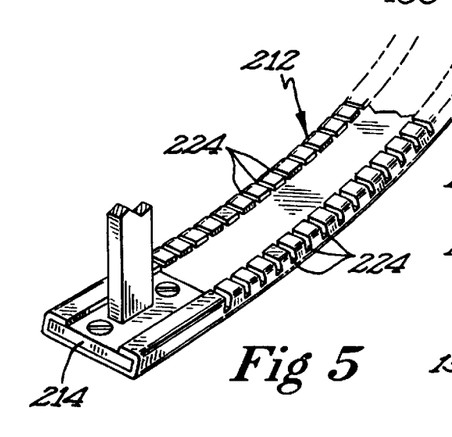
FIG. 5 shows a partial, perspective view of the flexible chain guide of the bag mechanically processing system of FIG. 1.
Figure 6:
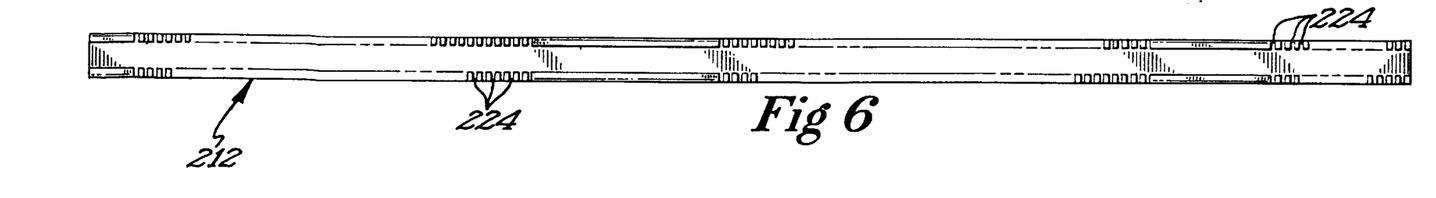
FIG. 6 shows a top view of the flexible chain guide of FIG. 5 according to view line 6—6 of FIG. 1.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "inside", "outside", "outer", "inner", "upper", "lower", "height", "width", "length", "thickness", "end", "side", "upstream", "downstream", "horizontal", "vertical", "axial", "radial", "longitudinal", "lateral", and similar terms are used herein, it should be understood that these terms have reference only to the structure shown in the drawings as it would appear to a person viewing the drawings and are utilized only to facilitate describing the illustrative embodiment.

DESCRIPTION

A system for mechanically processing pliable bags according to the preferred teachings of the present invention is shown in the drawings and generally designated 10. Generally, system 10 includes an inspector section 150 which is angled at generally 20° from the horizontal, with inspector section 150 feeding the pliable bags 16 to a conveyor 12 for transporting pre-filled bags 16 to a position below a mechanism for transferring bags 16 to a carton loading apparatus or the like.

Generally, inspector section 150 includes an elongated lower conveyor 152 including a frame having a bed plate 154 and first and second sides 156 extending generally perpendicular from the bed plate 154 and extending generally vertically. Conveyor 152 further includes an endless carrier in the most preferred form of belting 158 between upstream and downstream end rollers 160 extending between sides 156 at opposite ends of bed plate 154. In the most preferred form, at least one of rollers 160 is driven, with the downstream end roller 160 being driven in the preferred form. An idler roller 162 extends between sides 156 and is positioned below bed plate 154 and intermediate end rollers 160. Belting 158 extends from downstream roller 160 beneath bed plate 154 and extends around roller 162 to an idler roller 164 located intermediate roller 162 and downstream end roller 160, with belting 158 extending over 180° around roller 162. In the most preferred form, idler roller 164 extends between sides 156 and is adjustable to change the spacing from roller 162 and thus the tension upon belting 158. From idler roller 164, belting 158 extends to upstream end roller 160.

Belting 158 is generally supported upon and movable or slideable upon bed plate 154 between end rollers 160. In the most preferred form, lower conveyor 152 includes an idler roller 166 extending between sides 156 and having an outer periphery extending through an opening formed in bed plate 154 and for engaging with belting 158 across its lateral width and for slightly spacing belting 158 from bed plate 154. The opening through which idler roller 166 extends is of a width generally equal to but preferably slightly less than the lateral width of belting 158 to prevent belting 158 from catching in the opening. In the preferred form, roller 166 is located adjacent to upstream end roller 160 and in the most preferred form is located generally 20% of the spacing between end rollers 160.

In the most preferred form, lower conveyor 152 further includes one or more conditioning rollers 168, with one conditioning roller 168 being provided in the preferred form shown. In the preferred form, each roller 168 includes a shaft 170 and first and second axially spaced, parallel, conditioning elements 172 mounted to shaft 170. Particularly, shaft 170 is rotatably mounted between sides 156 about an axis which is perpendicular to the movement direction of bags 16 on lower conveyor 152 and is rotated such that the periphery of conditioning roller 168 engaging belting 158 moves in a direction opposite to the movement direction of belting 158 and of bags 16 supported thereon. If more than one conditioning roller 168 is provided, conditioning rollers 168 could rotate in opposite directions from each other. Each conditioning element 172 has a periphery of an axial length considerably smaller than and clearly less than one half of the lateral width of belting 158 and in the most preferred form of approximately 20% of the lateral width of belting 158. The periphery of each conditioning element 172 is of unequal spacing from the axis of shaft 170. Specifically, in the preferred form, four semicylindrical shaped abutments 174 are held with the arcuate portions outward and at 90° intervals about the axis of shaft 170, with the radius of each abutment 174 being generally three eighths of the radial spacing of the periphery from the axis of shaft 170. However, it can be appreciated that conditioning element 172 could have other shapes and configurations including but not limited to of a square configuration having the corners radiused. In the most preferred form, conditioning elements 172 are located spaced slightly inward of the side edges of belting 158 and are spaced slightly less than one half of the lateral width of belting 158 from each other. In the most preferred form, each conditioning element 172 is driven by roller 162 (which is rotated by its engagement with belting 158) such as by a sprocket and roller chain arrangement so that the peripheries of conditioning elements 172 engage with and deflect belting 158.

System 10 according to the preferred teachings of the present invention further includes an inlet section 176 for receiving filled, sealed, pliable bags 16 in a vertical orientation directly from a machine for forming, filling, sealing, and cutting bags 16 or from any other source. In the most preferred form, inlet section 176 includes first and second sides 178 extending contiguously upstream from the upstream ends of sides 156. First and second pulleys 180 are rotatably mounted about spaced horizontal axes between sides 178, with at least one of pulleys 180 being driven by upstream end roller 160 (which is rotated by its engagement with belting 158) such as by a sprocket and roller chain arrangement. Each pulley 180 includes a plurality of axially spaced, circumferential grooves 182. A plurality of bands 184 of a number corresponding to the number of grooves 182 are located in the plurality of grooves 182 and extend between corresponding grooves 182 of first and second pulleys 180, with bands 184 having generally circular cross sections in a non-stretched condition. In the most preferred form, the upper run of bands 184 are at an obtuse angle in the order of 165° to belting 158 of lower conveyor 152.

Inlet section 176 further includes first and second generally L-shaped members 188 which form a U-shaped funnel. In particular, each member 188 includes a first side leg 190 extending parallel to sides 156 and 178 and a second end or slide leg 192 extending generally perpendicular to sides 156 and 178 and to first side leg 190. Legs 192 extend at an obtuse angle in the order of 120° to the upper run of bands 184. Due to its angular relationship, legs 192 extend at an obtuse angle in the order of 125° to the horizontal. Legs 190 extend downstream from legs 192 along sides 178 and along sides 156 generally to idler roller 166, with legs 192 extending generally vertically and perpendicular to first and second pulleys 182 and their rotational axes, to bed plate 154 and to the upper run of bands 184 and parallel to bands 184 extending between pulleys 180.

Legs 192 of first and second members 188 are mounted in a slideable, abutting relation to form an adjustable width slide, with the outside surface of leg 192 of one of first and second members 188 abutting with the inside surface of leg 192 of the other of first and second members 188. Suitable provisions such as a hand crank threaded mechanism extends between first and second members 188 to adjust the spacing between legs 190 of first and second members 188 to generally correspond to the width of bags 160 desired to be inspected. It should be appreciated that the funnel could be formed in other manners including but not limited to being of a fixed width and may be replaceable for the width of bags 160 desired to be inspected.

Inspector section 150 further includes an elongated overhead conveyor 194 including a frame having first and second sides 196. First and second sprockets 198 are mounted to shafts extending between and rotatably mounted about spaced horizontal axes between sides 196. At least one of sprockets 198 is driven by roller 162 (which is rotated by its engagement with belting 158) such as by a sprocket and roller chain arrangement. An endless carrier including a roller chain 200 extends around sprockets 198. Each of the links of roller chain 200 includes a plastic carrier element including an elongated head 202 abutting with the outer surface of the link. First and second L-shaped projections 204 integrally extend from the inner surface of elongated head 202. In particular, the first legs of projections 204 extend generally perpendicular from the inner surface of elongated head 202 in a parallel relation spaced generally equal to and for attachment to the link of roller chain 200. The second legs of projections 204 extend generally perpendicular outwardly in opposite directions from the other ends of the first legs of projections 204. The longitudinal dimension of heads 202 and projections 204 is generally equal to the longitudinal dimension of the links of roller chain 200, and the lateral dimension of heads 202 is substantially greater than the lateral dimension of the links of roller chain 200 and in the preferred form of the spacing between the free ends of the second legs of projections 204.

The upper run of roller chain 200 is suitably supported by first and second planar chain guides 206. Chain guides 206 of the preferred form are of a conventional design and have generally C-shaped cross sections. First and second support plates 208 are suitably mounted to the frame of overhead conveyor 194 and are slideably received and fixed in chain guides 206. Plates 208 and guides 206 have a substantial length generally equal to 70% of the distance between sprockets 198 extending from the upstream sprocket 198 towards but spaced from downstream sprocket 198. Chain guides 206 are in a parallel relation spaced generally equal to the spacings between the first legs of projections 204. The inside surfaces of heads 202 on opposite sides of roller chain 200 abut with, slide upon and are supported on the outer surfaces of chain guides 206, with chain guides 206 being formed of friction reducing material such as plastic to reduce frictional forces between heads 202 and guides 206. The second legs of projections 204 are located below and spaced from the inner surface of guides 206 opposite to the outer surfaces of chain guides 206 and adjacent the inside edges of first and second chain guides 206.

The lower run of roller chain 200 is suitably supported by first and second flexible chain guides 212 having generally C-shaped cross sections. A first pair of support plates 214 are suitably mounted to the frame of overhead conveyor 194 adjacent to the upstream sprocket 198 and are slideably received and fixed in chain guides 212. A second pair of support plates 216 are slideably received in chain guides 212 downstream from support plates 214 and generally at one third of the distance between sprockets 198. Support plates 216 are suitably mounted to the frame of overhead conveyor 194 for movement toward and away from lower conveyor 152, with support plates 216 being parallel to and spaced from bed plate 154 and parallel to the movement direction of bags 16 sandwiched between conveyors 152 and 194 at all positions. In the most preferred form, support plates 216 are mounted to the frame of overhead conveyor 194 by parallelogram linkages 218. A third pair of support plates 220 are slideably received in chain guides 212 downstream from support plates 216 and generally at three fourths of the distance between sprockets 198. Support plates 220 are suitably mounted to the frame of overhead conveyor 194 for movement toward and away from lower conveyor 152, with support plates 220 being parallel to and spaced from bed plate 154 and parallel to the movement direction of bags 16 sandwiched between conveyors 152 and 194 at all positions. In the most preferred form, support plates 202 are mounted to the frame of overhead conveyor 194 by parallelogram linkages 222.

In the preferred form, support plates 216 and 220 are of a rectangular, planar shape. In the most preferred form, the longitudinal length of support plates 216 is generally equal to or larger than the longest length of bag 16 desired to be inspected by section 150 and in the preferred form is approximately 15% of the length of the lower run of roller chain 200. The longitudinal length of support plates 214 is 20% the longitudinal length of support plates 216. The longitudinal length of support plates 220 is such that support plates 220 and the lower run of roller chain 200 engaging two bags 16 on conveyor 150 will not be at their maximum spacing from conveyor 150 and that their maximum spacing from conveyor 150 is reached only when engaging a single bag 16 and in the preferred form is 70% of the longitudinal length of support plates 216.

In the most preferred form, chain guides 212 are of the same construction as chain guides 206 but include a series of equally longitudinally spaced lateral cuts 224 located between support plates 214 and 216, between support plates 216 and 220, and after support plates 220 to the downstream end of guides 212. Cuts 224 extend through the upstanding L-shaped legs of the C-shaped cross sections of guides 212 to a depth generally equal to and corresponding to the inside face of the central members of the C-shaped cross sections of guides 212. In the most preferred form, the portions of chain guides 212 corresponding to support plates 214, 216 and 220 are free of lateral cuts 224 and are relatively inflexible.

Chain guides 212 are in a parallel relation spaced generally equal to the spacings between the first legs of projections 204. The second legs of projections 204 on opposite sides of roller chain 200 abut with, slide upon and are supported on the inner surface of guides 212 adjacent to the inside edges of first and second chain guides 212. The inside surfaces of heads 202 on opposite sides of roller chains 200 are located below and spaced from the outer surface of chain guides 212. It can be appreciated that lateral cuts 224 allow chain guides 212 and thus roller chain 200 and the plastic elements carried thereby to flex.

Lower and overhead conveyors 152 and 194 are mounted in a parallel, vertically spaced arrangement such as by supports extending between sides 156 and 196. In the referred form shown, such supports are of a fixed length and are simply bolted to sides 156 and 196, with the bolt holes therein possibly being elongated for manufacturing tolerances and not intended for field adjustment. However, it can be appreciated that conveyors 152 and 194 could be mounted for field adjustment of the vertical spacing therebetween to allow passage of bags 16 of a greater range of thicknesses if desired and/or necessary. However, system 10 according to the teachings of the present invention as will be explained further hereinafter has been found to be acceptable without including vertical adjustment of overhead conveyor 194 relative to lower conveyor 152.

Suitable provisions are further provided for measuring the spacing between support plate 220 and bed plate 154 or in other words the movement of support plate 220 relative to lower conveyor 152. In the most preferred form, a rotary encoder or sensor 226 is provided rotatably connected such as by a belt and pulley arrangement to one of the pivots of linkage 222, with pivoting of linkage 222 causing rotation of sensor 226 which varies an electrical signal provided to the controller of system 10. It may be desirable to also detect movement of support plates 216 relative to lower conveyor 152. The use of two sensors 226 may be desirable to detect an air fill difference as bag 16 moves between support plates 216 and 220 for detecting slow leaking bags 16. A photo eye sensor can be used to keep track of the location of bags 16 on conveyor 152. Such a photo eye sensor can also be utilized to detect when individual bags 16 are connected together such as in the event that the seals are not cut between the upper and lower seals of succeeding bags 16 or to detect when bags 16 are too close together on conveyor 152.

Now that the basic construction of system 10 according to the preferred teachings of the present invention has been explained, a preferred mode of operation and some of the advantages of system 10 can be set forth. In particular, a typical manner of forming, filling and sealing bags 16 is to first form a tube around a mandrel from a sheet of material. After a first end is sealed, the product such as potato chips is filled through the mandrel into the open end of the tube. After filling with product, a second end of the tube is sealed and then cut to separate bag 16 from the tube. Thus, the separated, sealed bag 16 includes product such as potato chips and a volume of trapped air. It can be appreciated that typically the second seal is simultaneously formed with the first seal of the succeeding bag 16 in production. Furthermore, production is typically performed vertically, with the mandrel and tube being arranged vertically so that the product will fall under gravitational forces into the tube onto the first seal. It should be appreciated that although in production the first seal is vertically below the second seal, either the first or second seal can form the top (or the bottom) of bag 16 when marketed. It should also be appreciated that the product will tend to bunch adjacent to the first seal in production and thus in bag 16 as it is cut from the tube.

According to the preferred teachings of the present invention, after being cut from the tube and released by the forming, filling, and sealing apparatus, bag 16 falls vertically under gravitational forces with the first seal at the lower end of bag 16 contacting and sliding on the slide formed by second legs 192 of members 188 intermediate their upper and lower edges. Due to the angular relationship of legs 192, the first seal tends to slide downward on legs 192 toward and onto bands 184 and to tip bag 16 so that the second seal at the upper end of bag 16 moves toward legs 192. When the first seal slides from legs 192 onto bands 184, bands 184 will tend to convey the first seal of bag 16 downstream of the second seal and enhances the tipping movement of the second seal of bag 16 towards legs 192. It can be appreciated that inlet section 176 according to the preferred teachings of the present invention insure that bag 16 moves on bands 184 and upon lower conveyor 152 with the first seal being downstream of the second seal.

It can be appreciated that the forming, filling, and sealing apparatus occasionally may malfunction. One common malfunction is that the one or both of the first and second seals of bags 16 are not formed but the product is still filled in the tube anyway. Thus, the product may simply fall through the tube during the filling operation if the first seal is not sufficiently formed or may spill from the second seal as bag 16 is conveyed by inlet section 176 and inspector section 150. According to the teachings of the present invention, inlet section 176 is advantageous as such uncontained product can simply fall between bands 184 and is not carried through the entire system 10.

Inlet section 176 according to the teachings of the present invention feeds bags 16 onto lower conveyor 152 for conveying bags 16 in a movement direction with the first seals being downstream from the second seals. Due to the upward inclination of conveyor 152, the first seal is vertically elevated above the second seal. After movement upon lower conveyor 152, bags 16 will move under overhead conveyor 194 and be sandwiched between conveyors 152 and 194. Thus, the endless carriers of conveyors 152 and 194 are movable to move sealed bag 16 in a movement direction when sandwiched between the endless carriers of conveyors 152 and 194. In this regard, support plates 214 can be mounted to the frame of overhead conveyor 194 to create an angled or funnel like entry between conveyors 152 and 194.

As set forth previously, product will tend to be bunched adjacent to the first seal when it leaves the forming, filling and sealing apparatus. Due to the incline of inspector section 150 and the sandwiching between conveyors 152 and 194 when conditioning roller 168 engages with and deflects belting 158, the product will tend to move under gravitational forces toward the second seal so as to be of a uniform thickness inside bag 16. It can be appreciated that conditioning roller 168 enhances product movement inside of bag 16. In particular, conditioning roller 168 periodically flexes belting 158 so that the product inside bag 16 is squeezed between belting 158 and heads 202 of overhead conveyor 194. Roller 166 holds belting 158 away from bed plate 154 to increase the reciprocation distance of belting 158. However, it can be appreciated that roller 166 could be replaced with one or more conditioning rollers 168 and/or could be eliminated. Thus, system 10 according to the teachings of the present invention disperses product within sealed bag 16 that has been bunched adjacent to the first end and spaced from a second end to generally a more uniform thickness between the first and second ends.

It should be appreciated that due to the flexibility of guides 212 provided by cuts 224, heads 202 are positioned relative to belting 158 to have the shape of support plates 214, 216, and 220 and to be flexible to conform to the pillow shape of bags 16 and the product contained therein at positions other than when passing over support plates 214, 216 and 220. This conformation with the shape of bag 16 insures that relatively constant pressure is placed on bags 16 while eliminating or minimizing damage to product contained therein and especially relatively fragile products such as potato chips.

As bag 16 moves between conveyors 152 and 194, bag 16 moves between support plates 216 and bed plate 154, with support plates 216 deflecting roller chain 200 to positions at different spacings from conveyor 152, with support plates 216 holding heads 202 in a generally planar shape parallel to bed plate 154. As a bag 16 moves between support plates 216 and bed plate 154, bag 16 moves the endless carrier and support plate 216 of overhead conveyor 194 away from lower conveyor 152 and thereby placing pressure or squeezing force on bag 16, with the pressure being applied evenly over bag 16 due to linkage 218. Additionally, the squeezing force placed on bag 16 between belting 158 and heads 202 can be increased for the travel distance corresponding to the length of plates 216. This additional squeezing force can be provided by adding additional mass to support plates 216, by biasing the pivotal movement of linkage 218, or the like. This squeezing force will tend to force air out of any bag 16 which is not properly sealed, which includes tears or holes, or which is otherwise defective. Maintaining support plates 216 parallel to bed plate 154 minimizes damage to product inside of bag 16, even relatively fragile product such as potato chips.

As bag 16 continues to move between conveyors 152 and 194, bag 16 moves from beneath support plates 216 to a position between support plates 216 and 220. In this position, bags 16 are only subjected to the weight of the endless carrier and guides 212 of overhead conveyor 194.

The positioning of support plates 216 and 220 relative to each other can be changed according to the requirements of conveyor length.

Thereafter, bags 16 move to a position between support plate 220 and bed plate 154. Support plates 220 deflect roller chain 200 to positions at different spacings from conveyor 152, with support plates 220 holding heads 202 in a generally planar shape parallel to bed plate 154. The thickness of bag 16 can be sensed by sensor 226 according to the movement of support plate 220 relative to bed plate 154. In this regard, a properly sealed bag 16 including product and air captured therein will have a greater thickness between support plate 220 and bed plate 154 than a bag 16 which does not include product and/or which includes product but with part or all of the air being squeezed out when bag 16 passed between support plate 216 and bed plate 154. If sensor 226 provides an electrical signal to the controller of system 10 that the thickness is not within a tolerable range, system 10 can reject each bag 16 not of the desired thickness such as by having conveyor 12 convey such bags 16 into a reject bin rather than being transferred to a carton loading apparatus or the like. Maintaining support plate 220 parallel to bed plate 154 minimizes damage to product inside of bag 16, even relatively fragile product such as potato chips.

The use of parallelogram linkages 218 and 222 in movably mounting support plates 216 and 220 according to the preferred teachings of the present invention is especially advantageous in allowing system 10 to inspect a variety of sizes of bags 16. In particular, lower and overhead conveyors 152 and 194 as well as inlet section 176 can be of a width to receive a large range of widths of bags 16. In this regard, members 188 can be adjusted so that bags 16 are centered or otherwise positioned as desired in inlet section 176 and between lower and overhead conveyors 152 and 194. Likewise, system 10 can operate on a large range of lengths of bags 16 between the first and second seals. Further, parallelogram linkages 218 and 222 allow support plates 216 and 220 to move a variety of distances relative to bed plate 154 corresponding to the thickness of a variety of sizes of bags 16. In this regard and in the preferred form, the size of bag 16 can be inputted into the controller of system 10 and the controller will automatically adjust operation for the tolerable range of thickness for that particular size of bag 16. Thus, it is not necessary to provide field adjustment of the spacing between conveyors 152 and 194 for differing sizes of bags 16 or for bags 16 containing different types of products. Thus, the complexity and expense of the components for inspector section 150 is reduced according to the preferred teachings of the present invention than if overhead conveyor 194 was vertically adjustable relative to conveyor 152.

As bag 16 continues to move between conveyors 152 and 194, bag 16 moves from beneath support plates 220 to a position downstream therefrom to exit from between conveyors 152 and 194 for transfer to conveyor 12.

Now that the basic teachings of the present invention have been explained, many extensions and variations will be obvious to one having ordinary skill in the art. For example, in the preferred form, system 10 according to the preferred teachings of the present invention incorporates several unique features believed to produce synergistic results. However, it can be appreciated that such features can be utilized separately or in a variety of other combinations according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. System for mechanically processing pliable sealed bags received in a vertical orientation having a lower end and an upper end, with the sealed bag including product bunched at the lower end and a volume of trapped air, comprising, in combination: a lower conveyor including an endless belting for conveying the sealed bag in a movement direction; at least a first conditioning roller rotatable about an axis and having a periphery of an unequal spacing from the axis for engaging with and deflecting the endless belting of the lower conveyor; an overhead conveyor including an endless carrier, with the endless belting and the endless carrier being movable to move the sealed bag in the movement direction when sandwiched between the endless belting and the endless carrier, with the overhead conveyor further including first and second support plates each having a planar shape and movable to positions at different spacings from the endless belting, with the support plates being parallel to the endless belting and the movement direction, with the second support plate being downstream from the first support plate; a sensor for detecting movement of the second support plate relative to the overhead conveyor; and a flexible chain guide having generally C-shaped cross sections formed by first and second L-shaped legs upstanding from a central member, with the C-shaped cross sections adapted to slideably receive the first and second support plates, with the flexible chain guide including a series of longitudinally spaced lateral cuts extending through the first and second L-shaped upstanding legs, with the endless carrier being slideably captured on the flexible chain guide and having the shapes of the support plates while passing over the support plates and being flexible at positions other than when passing over the support plates.

2. Apparatus for dispersing product within a sealed bag that has been bunched adjacent to a first end and spaced from a second end comprising, in combination: an endless belting for conveying the sealed bag in a movement direction; and at least a first conditioning roller rotatable about an axis and having a periphery of an unequal spacing from the axis for engaging with and deflecting the endless belting to disperse the product within the sealed bag without changing the speed of the sealed bag in the movement direction and as the result of the rotation of the first conditioning roller about the axis deflecting the endless belting due to the unequal spacing of the periphery from the axis of the first conditioning roller.

3. The apparatus of claim 2 further comprising, in combination: an overhead conveyor, with the bag being sandwiched between the endless belting and the overhead conveyor when the conditioning roller engages with and deflects the endless belting to squeeze the bag between the endless belting and the overhead conveyor.

4. The apparatus of claim 3 wherein the endless belting is arranged at an acute angle to the horizontal, with the endless belting conveying the sealed bag with the first end being vertically elevated above the second end so that the product travels in the bag under gravitational forces.

5. The apparatus of claim 2 wherein the conditioning roller comprises, in combination: a shaft; and first and second axially spaced conditioning elements mounted on the shaft and engaging with and deflecting the endless belting, with the endless belting having a lateral width, with each of the conditioning elements having an axial length less than one half of the lateral width of the endless belting.

6. The apparatus of claim 2 further comprising, in combination: a bed plate for slideably supporting the endless belting, with the endless belting having a lateral width; an opening formed in the bed plate extending across the lateral width of the endless belting; and an idler roller extending through the opening formed in the bed plate and engaging with the endless belting across the lateral width for slightly spacing the endless belting from the bed plate.

7. Apparatus for testing sealed bags including product and a volume of trapped air comprising, in combination: a lower conveyor including a first endless carrier; an overhead conveyor including a second endless carrier, with the first and second endless carriers being movable to move the sealed bag in a movement direction when sandwiched between the first and second endless carriers, with the overhead conveyor further including a first support plate for deflecting the second endless carrier to positions at different spacings from the first endless carrier, with the first support plate being parallel to the first endless carrier and the movement direction, with the overhead conveyor further including a second support plate for deflecting the second endless carrier to positions at different spacings from the first endless carrier, with the second support plate being parallel to the first endless carrier and the movement direction, with the second support plate being downstream from the first support plate; and a sensor for detecting movement of the second support plate relative to the overhead conveyor; wherein the overhead conveyor further includes a first parallelogram linkage for movably supporting the first support plate and includes a second parallelogram linkage for movably supporting the second support plate, with the sensor detecting movement of the second parallelogram linkage.

8. The apparatus of claim 7 wherein the second endless carrier includes a roller chain; and wherein the overhead conveyor further includes a flexible chain guide having generally C-shaped cross sections formed by first and second L-shaped legs upstanding from a central member, with the C-shaped cross sections adapted to slideably receive the first and second support plates, with the flexible chain guide including a series of longitudinally spaced lateral cuts extending through the first and second L-shaped upstanding legs.

9. The apparatus of claim 8 wherein the overhead conveyor further includes a third support plate upstream of the first support plate, with the C-shaped cross sections adapted to slideably receive the third support plate, with the series of longitudinally spaced lateral cuts being located only between the first and third support plates, between the first and second support plates, and downstream of the second support plate.

10. The apparatus of claim 8 wherein the roller chain includes a plurality of links, with each link including a carrier element having an elongated head and at least a first L-shaped projection extending from the elongated head, with the flexible chain guide extending between the elongated head and the L-shaped projection.

11. The apparatus of claim 6 wherein the movement direction is at an acute angle to the horizontal, with the overhead conveyor being supported at a fixed spacing from the lower conveyor and without field adjustment of the fixed spacing.

12. Method for testing sealed bags including product and a volume of trapped air comprising: conveying the sealed bags in a movement direction on a lower conveyor; sandwiching the sealed bag on the lower conveyor by an endless carrier of an overhead conveyor; deflecting the endless carrier by a first support plate which is parallel to the lower conveyor and the movement direction to push trapped air out of improperly sealed bags but which does not damage properly sealed bags and the product contained therein, wherein deflecting the endless carrier by the first support plate comprises providing a first parallelogram linkage for movably supporting the first support plate to the overhead conveyor; deflecting the endless carrier downstream of the first support plate by a second support plate which is parallel to the lower conveyor and the movement direction, wherein deflecting the endless carrier by the second support plate comprises providing a second parallelogram linkage for movably supporting the second support plate to the overhead conveyor; and sensing the deflection of the endless carrier by the second support plate.

13. Method for dispersing product within a sealed bag that has been bunched adjacent to a first end and spaced from a second end comprising: conveying the sealed bag in a movement direction on an endless belting; and deflecting the endless belting by engaging the endless belting opposite to the sealed bag by a conditioning roller rotatable about an axis extending perpendicular to the movement direction and having a periphery of unequal spacing from the axis to disperse the product within the sealed bag without changing the speed of the sealed bag in the movement direction and as the result of the rotation of the first conditioning roller about the axis deflecting the endless belting due to the unequal spacing of the periphery from the axis of the first conditioning roller.

14. The method of claim 13 wherein conveying the sealed bag comprises conveying the sealed bag in the movement direction at an acute angle to the horizontal with the first end being vertically elevated above the second end so that the product travels in the bag under gravitational forces.

15. Conveyor comprising, in combination: a frame; at least a first support plate having a shape and mounted to the frame; a flexible chain guide having generally C-shaped cross sections formed by first and second L-shaped legs upstanding from a central member, with the C-shaped cross sections adapted to slideably receive the support plate, with the flexible chain guide including a series of longitudinally spaced lateral cuts extending through the first and second L-shaped upstanding legs; and an endless carrier slideably captured on the flexible chain guide, with the endless carrier having the shape of the support plate while passing over the support plate and being flexible at positions other than when passing over the support plate.

* * * * *

UNITED STATES PATENT AND TRADEMARK OFFICE
CERTIFICATE OF CORRECTION

PATENT NO. : 6,094,888
DATED : August 1, 2000
INVENTOR(S) : Irvan Pazdernik, et al.

It is certified that error appears in the above-identified patent and that said Letters Patent is hereby corrected as shown below:

<u>Column 12,</u>
Line 21, cancel "6" and substitute therefor -- 7 --.

Signed and Sealed this

Thirteenth Day of November, 2001

Attest:

*Nicholas P. Godici*

NICHOLAS P. GODICI
*Acting Director of the United States Patent and Trademark Office*

*Attesting Officer*